G. M. BRAND.
FIELD LEVELER.
APPLICATION FILED AUG. 6, 1909.
957,732.
Patented May 10, 1910.
2 SHEETS—SHEET 1.
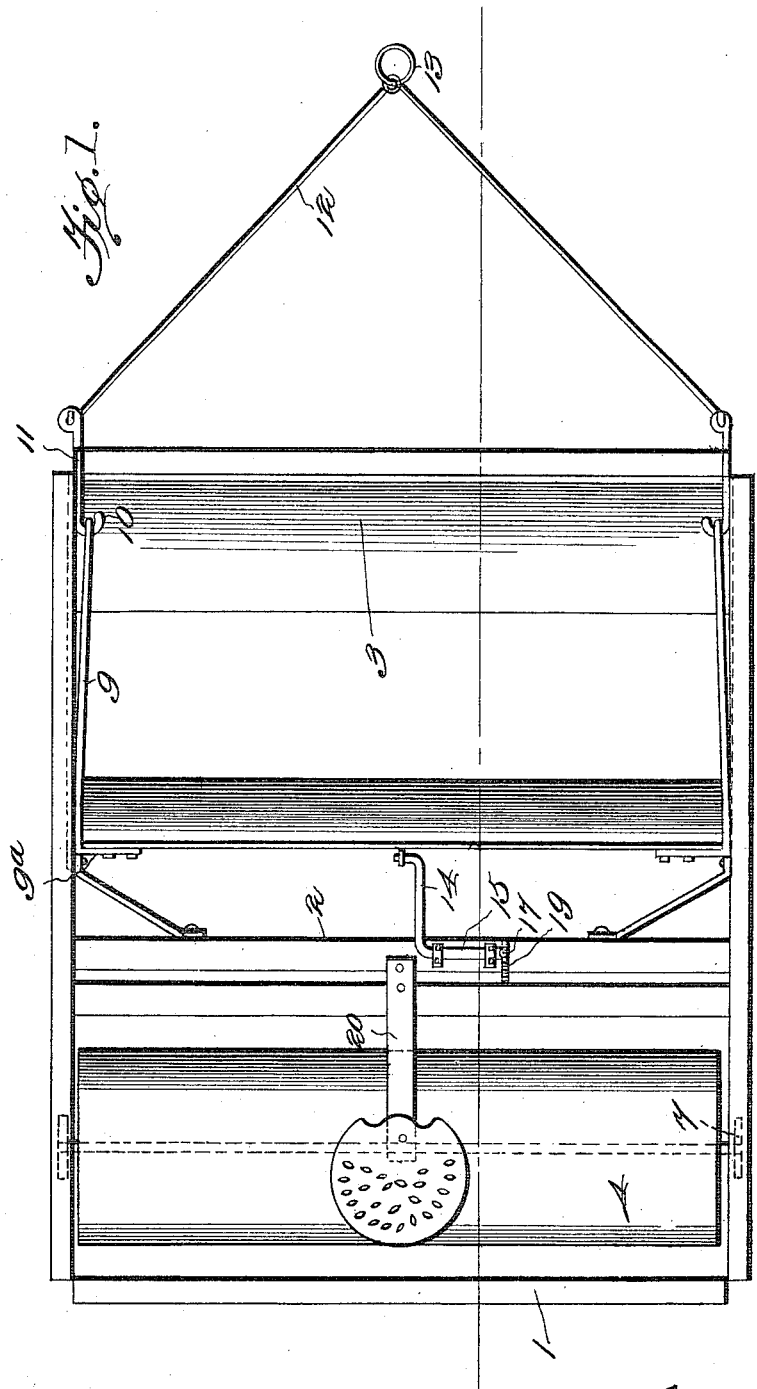

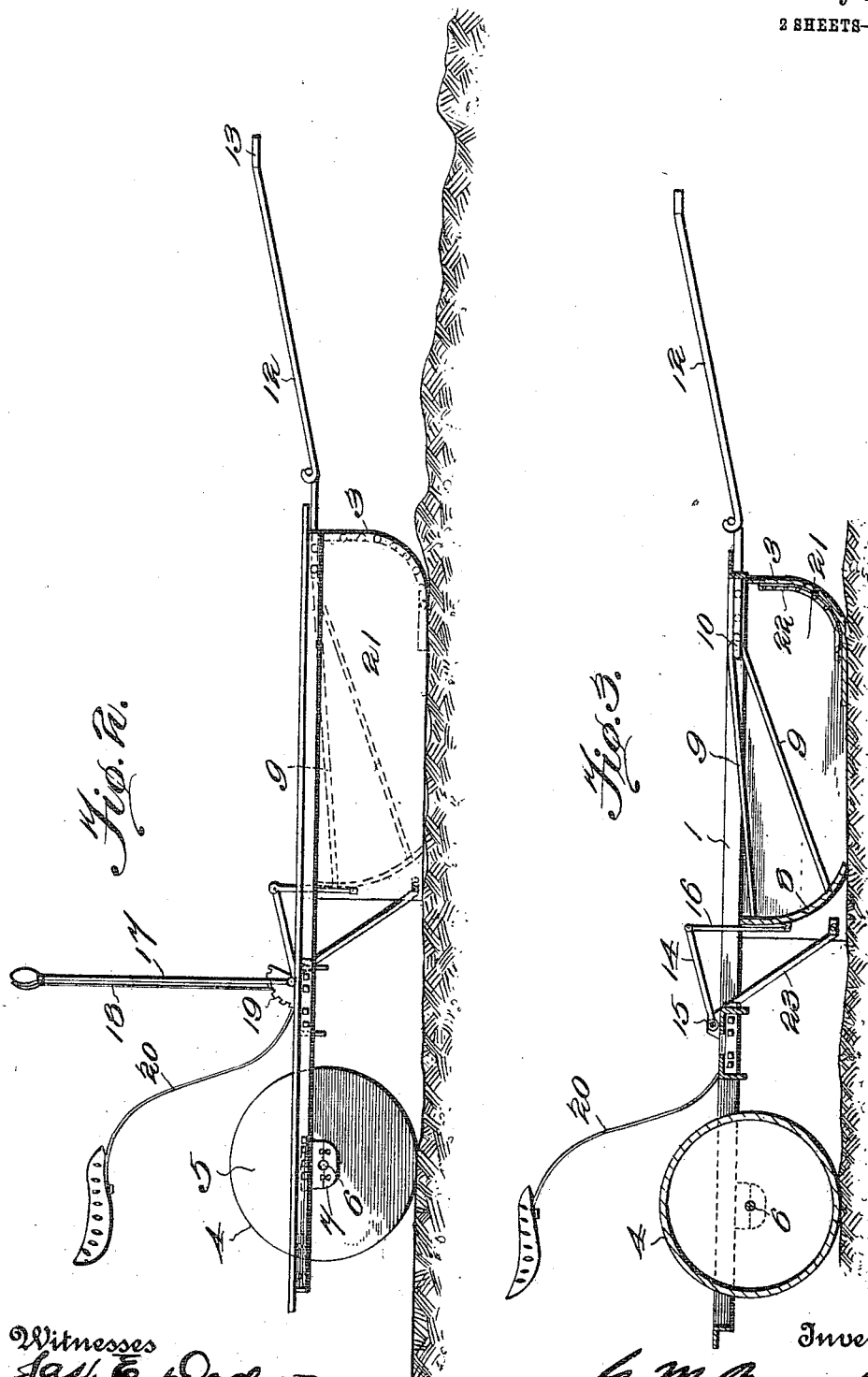

UNITED STATES PATENT OFFICE.

GEORGE M. BRAND, OF BRIGHTON, COLORADO, ASSIGNOR OF ONE-FOURTH TO H. T. BACON, OF GREELEY, COLORADO.

FIELD-LEVELER.

957,732.  Specification of Letters Patent.  Patented May 10, 1910.

Application filed August 6, 1909. Serial No. 511,611.

*To all whom it may concern:*

Be it known that I, GEORGE M. BRAND, a citizen of the United States, residing at Brighton, in the county of Adams and State of Colorado, have invented certain new and useful Improvements in Field-Levelers; and I do hereby declare the following to be a full, clear, and exact description of the invention, such as will enable others skilled in the art to which at appertains to make and use the same.

This invention relates to improvements in field levelers for agricultural purposes, and the object of the same is to provide a machine for leveling farm land, especially where the land has to be irrigated.

The principal object of the invention is to provide a machine which will level the loose ground so that no wheel ruts or other gullies are formed, and hence the field may be evenly flowed when irrigation is necessary. In land of this character the same has to be leveled and the ground packed to hold the moisture.

While the invention is not restricted in its details to the exact structure shown and described, for it is evident that modifications might be made without departing from the spirit of the invention, still for the purpose of disclosure reference is had to the accompanying drawings illustrating a practical embodiment of the invention, and the particular features of novelty will be pointed out more succinctly in the appended claims.

In the drawings, in which like numerals designate the same parts in the several views,—Figure 1 is a plan view of my improved machine, Fig. 2 a side elevation of same, and Fig. 3 a longitudinal section on the line 3—3 of Fig. 1.

1 designates a rectangular frame preferably of angle-iron construction, and 2 designates a pair of transversely extending angle brace bars suitably bolted to the side bars of the frame.

3 designates a downwardly and rearwardly curved shoe suitably secured to the frame at its upper end, said shoe supporting the forward end of the frame and adapted to ride over the ground without pushing the dirt ahead of it during its forward movement. The rear end of the frame is supported by a roller 4, which is preferably an iron or steel cylinder, and this roller 4 may have the head plates 5, or spokes if desired, provided with a shaft or axle pins 6 journaled in suitable boxes 7. Intermediate of the shoe and roller is disposed a leveler 8 extending across the frame, and this leveler is preferably curved downwardly and forwardly. The leveler is partly supported by means of the V-shaped leveler rods 9 disposed at each side of the frame and at their forward ends pivotally connected to the rear hook 10 of the draft hooks 11, which draft hooks are in turn connected to the draft rods 12, which may be two rods as shown joined simply by a draft ring 13, although other means may be employed. The top rear portion of the leveler is supported by the arm 14 of a crank member 15, by means of a strap iron 16, pivoted at one end to the crank arm and at its other end to the central upper rear portion of the leveler. The crank is operated by the usual lever 17, having a pawl rod 18 associated with a rack 19, and by this construction it will readily be seen that the leveler may be raised and lowered and held in its adjusted position.

20 is a seat supported by the cross rods 2.

As shown in Fig. 1, the leveler rods 9 are secured at their rear ends to the leveler by being bent inwardly, as shown at 9ª, and riveted or otherwise secured to the leveler.

21 designates a pair of fenders, one at each side of the frame, and these fenders at their upper ends are secured to the frame and at their forward ends are secured to the shoe by means of the curved angle braces 22. The fenders are preferably made of sheet steel and extend rearwardly from the forward end of the shoe a little beyond the leveler, and at their rear ends they are braced against strain by the angularly disposed brace rods 23 bolted or riveted at their lower ends to the inside faces of the fenders, and at their upper ends to one of the cross bars 2. These fenders will prevent the dirt from rolling past the ends of the leveler.

I am aware that there are a number of machines designed for the purpose of road making and scraping, but these machines are not adapted for use with farm land where the aim is not to carry off the surface dirt, but simply to level it and roll it so as to pack it to properly receive and retain moisture.

Having thus described the invention, what I claim is:—

1. In a field leveler the combination of a frame, a rearwardly curved shoe and a roller extending across said frame, said shoe and roller respectively supporting the forward and rear ends of said frame, and a leveler intermediate of said shoe and said roller, substantially as described.

2. In a field leveler the combination of a frame, a rearwardly curved shoe and a roller extending across said frame, said shoe and roller respectively supporting the forward and rear ends of said frame, and a vertically adjustable leveler intermediate of said shoe and roller, substantially as described.

3. In a field leveler the combination of a frame, a rearwardly curved shoe and a roller extending across said frame, said shoe and roller respectively supporting the forward and rear ends of said frame, and a vertically adjustable forwardly curved leveler intermediate of said shoe and roller, substantially as described.

4. In a field leveler the combination of a frame, a rearwardly curved shoe and a roller extending across said frame, said shoe and roller respectively supporting the forward and rear ends of said frame, a leveler intermediate of said shoe and roller, said leveler being pivotally supported on said frame by means of the forwardly extending pivoted leveler rods, a crank shaft provided with an arm supporting said leveler, and an operating lever connected to said crank shaft and coöperating with a pawl rod and rack to adjustably support said leveler, substantially as described.

5. In a field leveler the combination of a frame, a rearwardly curved shoe and a roller extending across said frame, said shoe and roller respectively supporting the forward and rear ends of said frame, an adjustable leveler intermediate of said shoe and roller, and side fenders connected to said frame and extending from said shoe rearwardly beyond said leveler, substantially as described.

6. In a field leveler the combination of a frame, a rearwardly curved shoe and a roller extending across said frame, said shoe and roller respectively supporting the forward and rear ends of said frame, draft hooks on each side of the forward end of said frame, leveler rods pivotally connected to the rear ends of said draft hooks and at their other rear ends connected to said leveler, means for vertically adjusting the height of said leveler, and draft rods connected to said draft hooks, substantially as described.

7. In a field leveler the combination of a frame, a rearwardly curved shoe and a roller extending across said frame, said shoe and roller respectively supporting the forward and rear ends of said frame, draft hooks secured at the forward sides of said frame, leveler rods pivotally connected to said draft hooks and at their rear ends supporting a forwardly curved leveler extending across said frame, side fenders connected to said frame and extending from said shoe rearwardly beyond said leveler, brace rods connecting the lower rear ends of said fenders to said frame, a crank having an arm supporting said leveler, and an operating lever for said crank and associated with a pawl and rack for adjustably supporting said leveler, substantially as described.

In testimony whereof, I affix my signature, in presence of two witnesses.

GEORGE M. BRAND.

Witnesses:
H. Z. MURRAY,
W. GREGORY.